US006537104B1

United States Patent
Hagmann et al.

(10) Patent No.: US 6,537,104 B1
(45) Date of Patent: Mar. 25, 2003

(54) CABLE CLAMP

(75) Inventors: Bernd Hagmann, Geislingen/Steige (DE); Peter Kuhn, Köngen (DE)

(73) Assignee: Hirschmann Electronics GmbH & Co. KG, Neckartenzlingen (DE)

( * ) Notice: Subject to any disclaimer, the term of this patent is extended or adjusted under 35 U.S.C. 154(b) by 0 days.

(21) Appl. No.: 09/830,335

(22) PCT Filed: Aug. 5, 1999

(86) PCT No.: PCT/EP99/05663

§ 371 (c)(1),
(2), (4) Date: Jul. 20, 2001

(87) PCT Pub. No.: WO00/25405

PCT Pub. Date: May 4, 2000

(30) Foreign Application Priority Data

Oct. 26, 1998 (DE) .......................................... 198 49 227

(51) Int. Cl.[7] .............................................. H01R 13/58
(52) U.S. Cl. ...................... 439/462; 439/583; 439/460; 439/461
(58) Field of Search ................. 439/462, 583, 439/606, 460, 461; 174/65 SS, 65 R, 83, 78

(56) References Cited

U.S. PATENT DOCUMENTS 4,810,832 A  3/1989  Spinner et al. ......... 174/65 SS

FOREIGN PATENT DOCUMENTS

DE    36 33 208    3/1988
EP    0 583 707    2/1994

*Primary Examiner*—P. Austin Bradley
*Assistant Examiner*—Alexander Gilman
(74) *Attorney, Agent, or Firm*—Fulbright & Jaworski

(57) ABSTRACT

A cable clamp (10) for clamping cable (11) in a tubular cable feed-through part (12) that has a pressure piece (33) comprised of two pressure rings (13, 14) with a clamping spring ring (15) positioned between the two pressure rings (13, 14) to encircle the cable (11). The pressure rings (13, 14) are interconnected so that they are movable with respect to each other in an axial direction over a distance permitting the clamping spring ring (15) to have an inner diameter equal or somewhat greater than the outside diameter of the cable (11) or compressed so as to have an inner diameter that is less than the outside diameter of cable (11).

35 Claims, 4 Drawing Sheets

CABLE CLAMP

BACKGROUND OF THE INVENTION

1. Field of the Invention

The present invention relates to a cable clamp. More particularly, the present invention relates to a cable clamp having a clamp lock washer that is positioned between two thrust collars that are movably interconnected so that the lock washer can be pressed against a cable.

2. Description of the Related Technology

A prior art cable clamp is already known from cable glands, for example so-called PG cable glands, such as for example the "UNI-Dicht [UNI-Tight] system from Pflitsch that is shown in FIG. 4.

Here the two pressure disks 1, the clamp lock washer 2 and the gasket 3 are separate parts which must be placed in the cable penetration part 4 with a sleeve 5 for installation of the cable clamp in an complex and expensive manner. Moreover the warehousing and mainly the keeping of these separate parts are expensive on site and not always reliably ensured especially for cable connections.

SUMMARY OF THE INVENTION

The object of the invention is to develop a cable clamp of the initially mentioned type, that is as simple and economical as possible, such that simple and prompt installation and economical storage of parts are enabled and the probability is minimized that parts of the cable clamp would be lost or lacking at the installation site.

This object is achieved by providing a movably interconnected pair of thrust collars having an enclosed clamp lock washer to form a thrust piece. The thrust piece which consists of two thrust collars and the clamp lock washer and which is assembled beforehand at the manufacturer to simplify both storage and installation and to make cable connection very fast. To do this simply the thrust piece can be inserted into the cable penetration part which is generally made as a socket piece of a housing, the cable can be guided through the sleeve and the relieved thrust piece and finally the sleeve can be attached to the cable penetration part, all in succession.

In the latter installation step moreover the two thrust collars with their permissible axial travel can be pressed against one another, by which the clamp lock washer on the oblique inner end faces of the thrust collars is pressed along the entire periphery towards the axis and thus against the cable so strongly that it is fixed by the desired degree.

According to one feature of the invention, the thrust collars are made by having one of the thrust collars have an annular flange with an inside diameter comparable to the outside diameter of the clamp lock washer in an uncompressed state. By this feature, without additional costs the clamp lock washer is retained and it cannot be laterally deflected, but is held centrally between the two thrust collars and thus also uniformly adjoins the cable periphery and can be pressed against it with a pressure which is the same over the entire contact surface. This is not only advantageous when the clamp lock washer is pressed into the plastic jacket of the cable by not doing damage to the jacket, but also, when making electrical contact under pressure it adjoins the shield of the stripped shielded cable because then the maximum contact surface is ensured.

Another object of the invention has a thrust piece which can be produced easily and economically, in which the two thrust collars which are provided for example by an injection molding process without additional cost so that one thrust collar has a groove and the other a series of catch arms. Then after insertion of the clamp lock washer between the thrust collars, they be pushed together. Here the width of the groove is such that after subtracting the thickness of the catch arms the desired size of the axial stoke necessary to compress and relieve the clamp lock washer results.

The aforementioned insertion-withdrawal process is greatly facilitated by the catch projections extending from one thrust collar being made to elastically fit into a groove included about the other thrust collar. The one thrust collar then need only be clipped with its catch projections by a minimum expenditure of force into the groove of the other thrust collar. This installation process if necessary can be carried out without tools by hand. For mechanical production, very simple tools can be used for this purpose.

One advantageous embodiment of the groove wall behind which the catch projections fit is to have a conically tapered projection. With this construction an especially small diameter for the thrust piece projection is enabled. In addition, over its entire length it has a constant diameter and thus optimum guidance in the cable penetration part.

For the case of a cable gland which is common in practice for shielded cables the cable shield can be conductively connected to the ground potential, for example by a metal housing. In the cable clamp of the present invention this is done in an advantageously simple manner by at least one of the two thrust collars consisting of electrically conductive material. If the housing-side inner thrust collar is made of metal, conductive connection of the cable shield takes place via the clamp lock washer and this inner thrust collar lies on the stop collar of the metal cable penetration part. The alternative possibility of making the outer thrust collar of metal for conductive connection of the cable shield to the housing presupposes that the sleeve likewise consists of metal and is conductively connected to the outer thrust collar.

In most applications the cable clamp in a cable penetration part must moreover ensure the tightness of the cable connection. This is achieved for the present invention in the known manner by the arrangement of a gasket between the outer thrust collar and the sleeve which when the sleeve is attached to the cable penetration part they are squeezed together such that the gasket moreover adjoins the cable and the inner surface of the sleeve under pressure.

This known gasket is a separate part which must be purchased in addition and stored at the warehouse. It is often not ready at the installation site nonetheless and requires another installation step.

Conversely, in another embodiment of the present invention, especially favorable storage and very simple installation processes for the thrust piece are achieved by the gasket being mechanically retained in the thrust collar which faces it. In this compact initial version of the thrust piece the connection, for example by screwing or locking, can be detachable. But the connection can also be nondetachable and thus made captive, for example by cementing the gasket to the outer thrust collar or by injection molding it thereto. This second alternative has the advantage of stronger connection of the gasket to the thrust piece and more economical production because the thrust collar and the gasket which had been injection molded can be produced in a single step by means of a double injection mold.

If the elasticity of the material of this thrust collar which faces the cable insertion area of the sleeve is large enough for sealing purposes, but still small enough to be able to accommodate the required pressure of the clamp lock washer when the sleeve is attached to the cable penetration part, it is especially advantageous to use the thrust collar moreover as a gasket. Thus a special gasket—whether as a separate part or one connected to the external thrust collar— is no longer necessary, so that the cable clamp can be produced and used especially easily and economically.

The greatest possible compactness of the cable clamp of the present invention is achieved by the version (see FIG. 1) in which a single premounted part is made available to the user by simply clipping the sleeve onto the gasket, which part can be produced not only with minimum cost, but enables extremely uncomplicated handling in practical use. This is because only the (optionally stripped) cable can be inserted through the gasket and the thrust piece as far as the desired position and then the sleeve can be attached to the contact penetration part. Here moreover the cable is clamped securely and the cable penetration area is sealed by compressing the gasket liquid-tight.

One especially feasible attachment of the sleeve to the contact penetration part, for example a socket piece of a housing, consists in providing a screw sleeve which can be screwed onto the cable penetration part which is made as a threaded socket. Not only the desired clamping pressure of the clamp lock washer and thus the necessary tension about the cable is achieved, but also the required sealing action according to the requirements of the individual case is achieved by the intensity of tightening of the screw sleeve in conjunction with the material selected for the gasket and the axial dimensions of the interacting parts of the cable clamp.

A simple and economical possibility for electrically insulating the metallic housing together with the socket piece and at the same time protecting it mechanically is to have a peripheral plastic molded sleeve positioned about the housing.

BRIEF DESCRIPTION OF THE DRAWINGS

The invention is explained below using one embodiment in the figures.

DETAILED DESCRIPTION OF THE INVENTION

Figure 1:
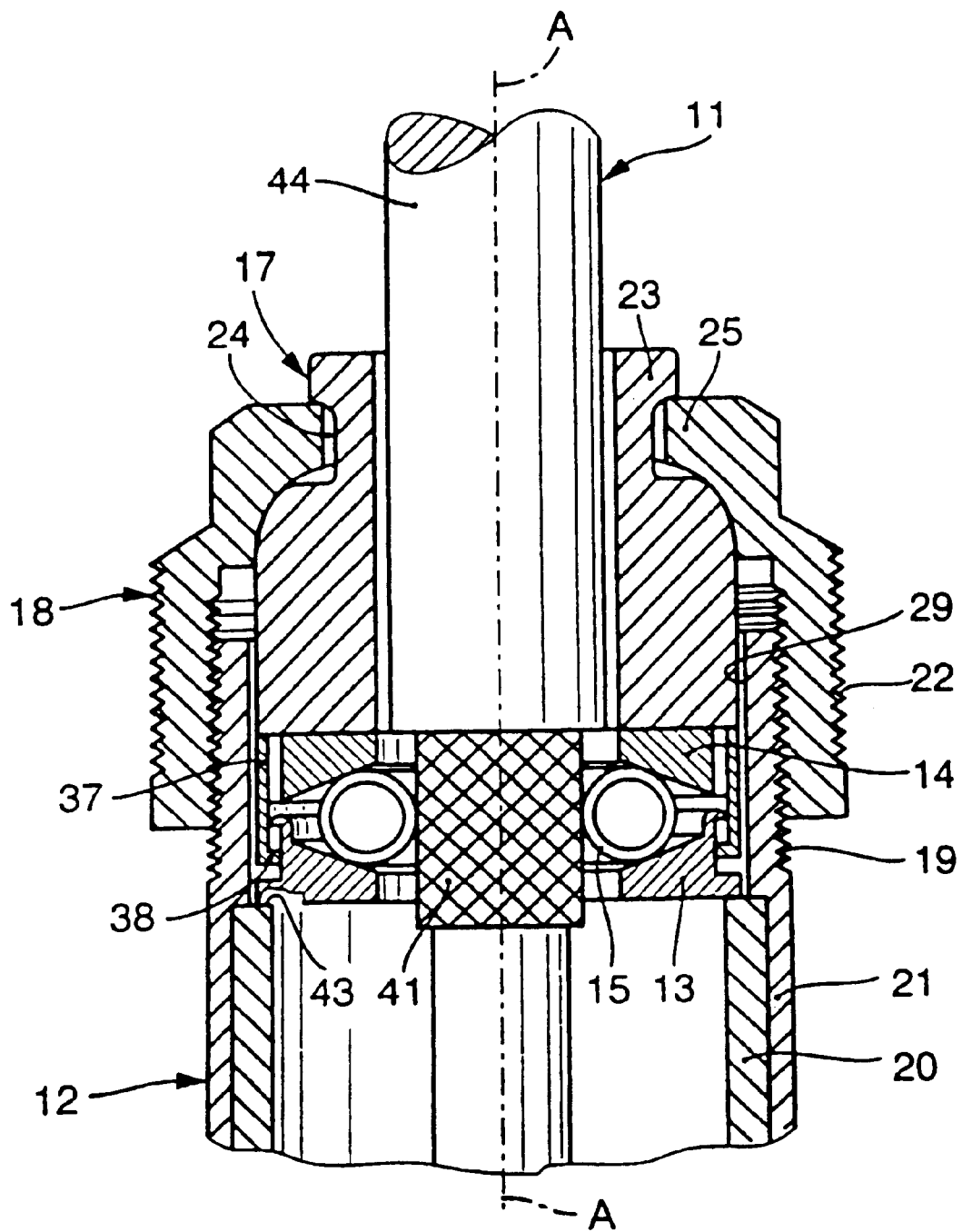
FIG. 1 shows an axial section through are installed cable clamp of the present invention, which has not yet been completely attached to the cable insertion connecting piece.
Figure 2:
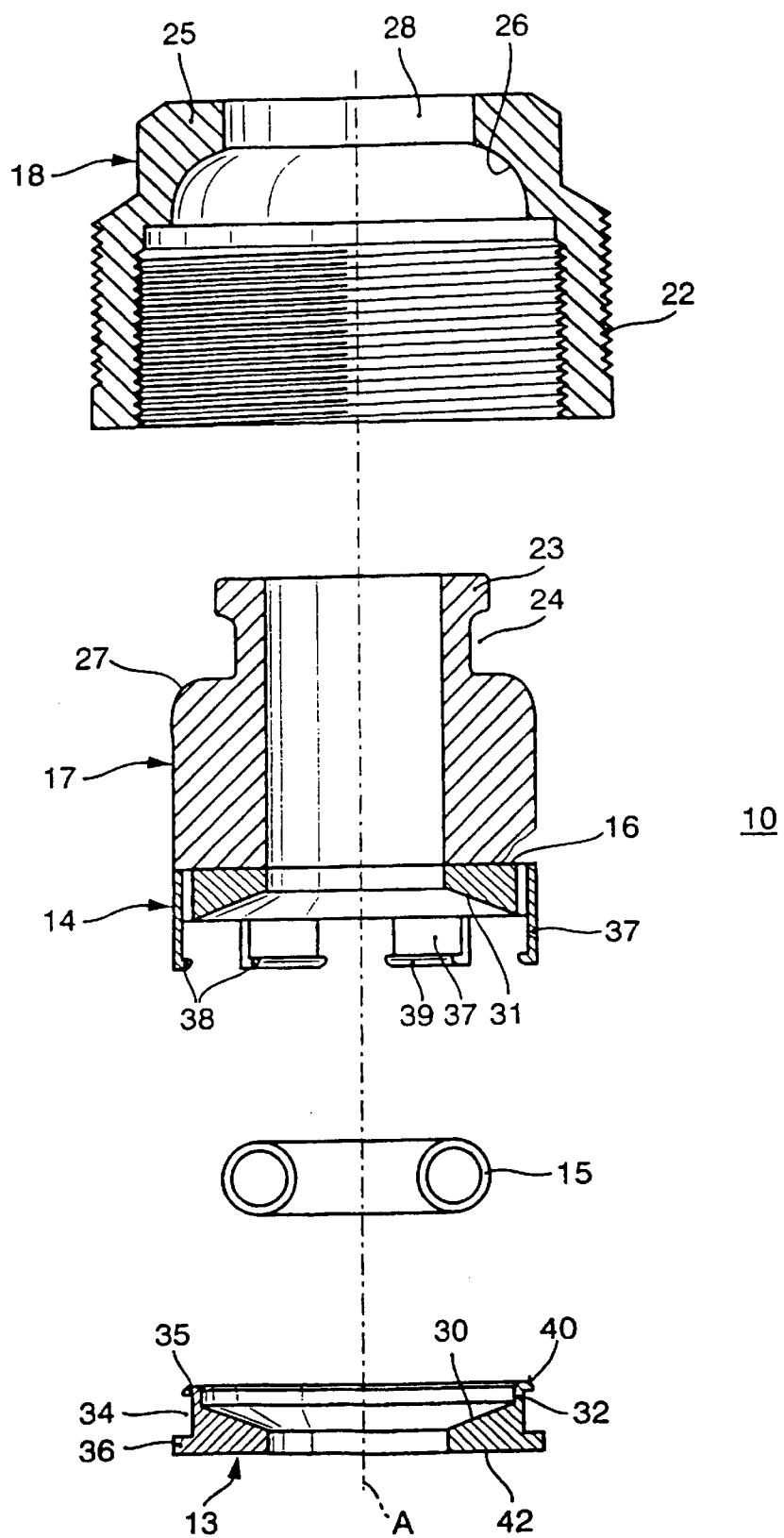
FIG. 2 shows an exploded axial section through the individual parts of the cable clamp of the present invention.
Figure 3:
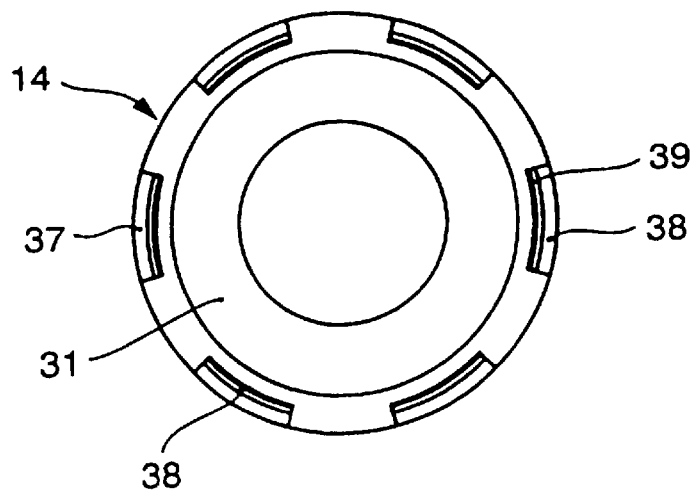
FIG. 3 shows an overhead view of the end faces of the two thrust collars facing one another and the clamp lock washer; and, FIG. 4 shows a halved view of a cable gland known from the prior art.
Figure 3:
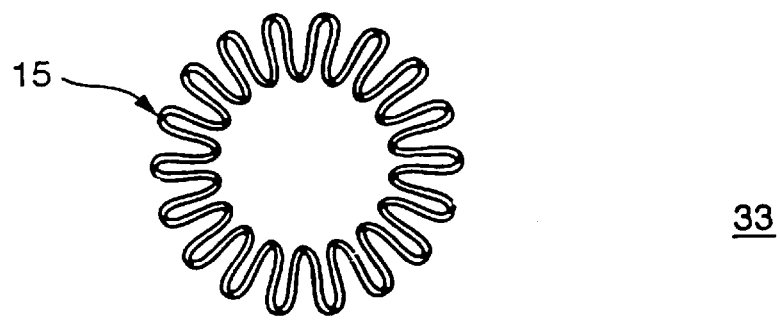
Figure 3:
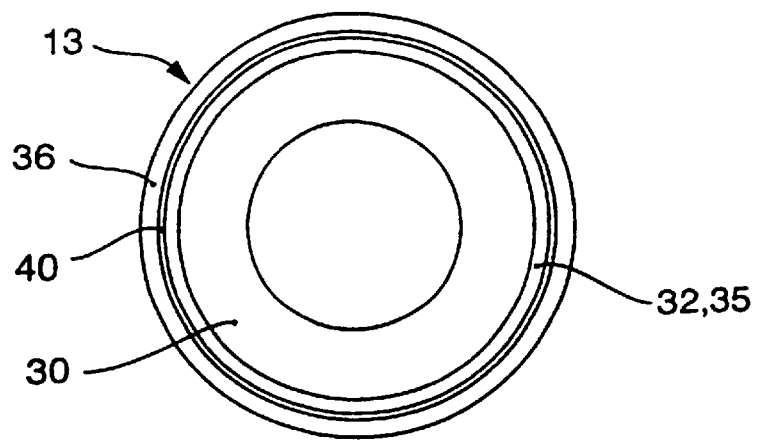
Figure 4:
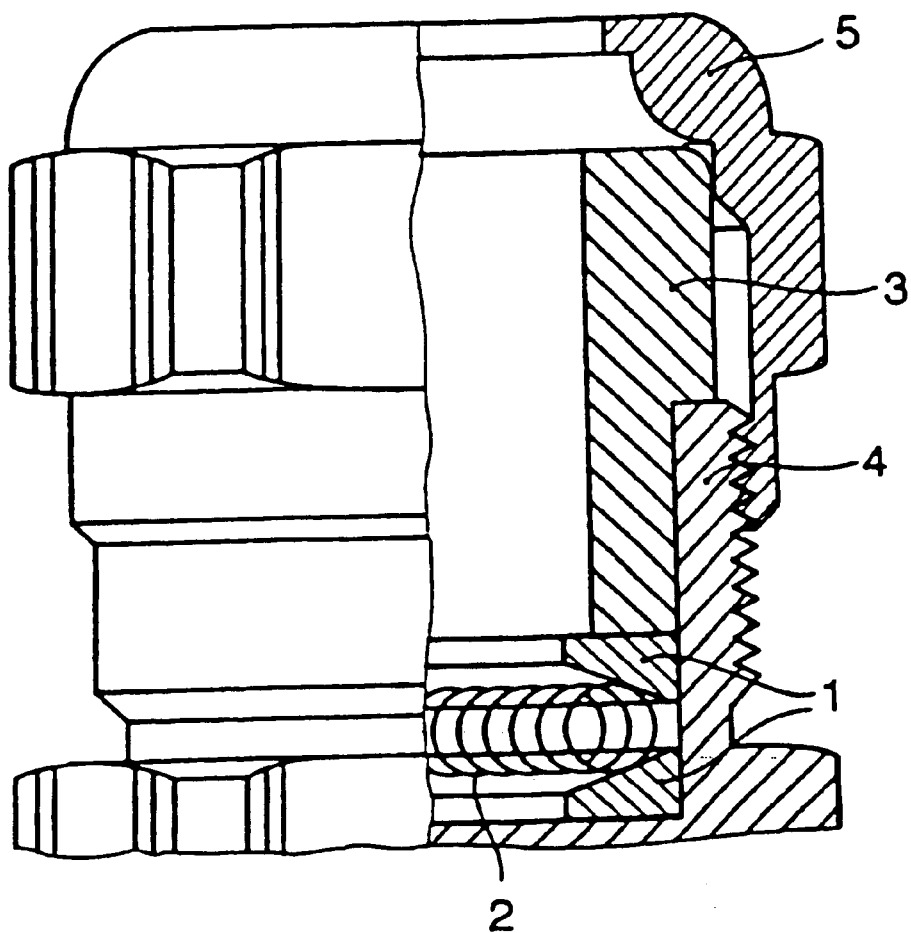

A cable clamp 10 (see FIG. 2) for clamping a shielded cable 11 in a tubular cable insertion connecting piece 12 of a metal housing which is not shown and which is integral with it for holding an electrical circuit is shown in FIG. 1. The cable clamp 10 consists of a housing-side inner metal thrust collar 13, a cable-side outer thrust collar 14 of plastic, a clamp lock washer 15 which is located between them and which is bent from a helical metal spring, a gasket 17 which is injection-molded to the cable-side end face 16 of the outer thrust collar 14, and a screw sleeve 18 which encompasses the gasket and which can be screwed onto a matched external thread 19 of the cable insertion connecting piece 12.

The insertion connecting piece 12 consists of a metallic inner socket piece 20 which is made in one piece with the metal housing, and a tubular plastic jacket 21 which is produced by extrusion coating and which has an external thread 19 on its free end. The screw sleeve 18 has a knurled grip 22 by which the required torque can also be applied when screwing on by hand.

The gasket 17 has a collar 23 with a peripheral recess 24 into which a terminal shoulder 25 of the screw sleeve 18 fits such that it can be turned on the one hand relative to the gasket 17 and on the other hand when screwed onto the external thread 10 compresses the gasket 17. In doing so the screw sleeve 18 and gasket 17 adjoin one another over a large surface by corresponding shaping of their surfaces facing one another such that high pressure is transferred both in the axial and also in the radial direction. The contours 26, 27 of the surfaces of the screw sleeve 18 and the gasket 17 which are pressed against one another for this purposes are arched concavely or correspondingly convexly, by which on the one hand the indicated force transfer is produced as in the interacting conical surfaces and on the other hand the gasket 17 is prevented from sliding through the inlet opening 28 of the screw sleeve 18.

Due to pressure in the radial direction the gasket 17 is moreover pressed against the inner surface 26 of the screw sleeve 18 and over a large area against the cable surface so that the cable insertion area of the cable insertion connecting piece 12 is reliably sealed. In addition, the gasket 17 is also pressed against the inner wall 29 of the free end part of the plastic sleeve 21, by which the cable clamp 10 is also secured against penetration of liquid via the threaded gland.

The end faces 30, 31 of the two thrust collars 13, 14 facing one another are tapered conically towards the axis A of the cable clamp 10. The end face 30 of the inner thrust collar 13 has on the outer edge an axially projecting end flange 32 which prevents lateral divergence of the clamp lock washer 15 which in the relieved state adjoins its inner surface and thus the installation of the thrust piece 33 which consists of the thrust collars 13, 14, and the clamp lock washer 15 is greatly facilitated in a simple manner.

The inner thrust collar 13 has a peripheral groove 34 with a first groove wall 35 facing the clamp lock washer 15 and a second groove wall 36.

The outer thrust collar 14 bears six catch arms 37 which are integral therewith, which are distributed uniformly on the periphery and which are provided with catch projections 38 which project towards the axis A, which are located on the free ends, and which each have an insertion bevel 39. The first groove wall 35 is equipped with an leading bevel 40 which corresponds to the insertion bevel 39.

With the thrust piece 33 installed the catch projections 38 fit behind the first groove wall 35 and can be moved axially by a correspondingly chosen width of the peripheral groove 34 [in it] by a stroke which is sufficient to compress the clamp lock washer 15. With the screw sleeve 18 strongly screwed on the required clamping force is achieved for applying tension to the cable 11.

The diameter of the first groove wall 35 is less by than the material thickness of the catch arm 37 and less than that of the second groove wall 36 so that the thrust piece 33 over its entire length has a constant outside diameter and thus can be inserted unhindered into the cable insertion connecting piece.

In the production of the cable clamp 10, first of all the thrust piece 33 is produced. To do this only the clamp lock washer 15 need be inserted into the inner thrust collar 13 and the outer thrust collar 14 with the gasket 17 molded on its outer end face 16. Then the outer thrust collar 14 can be clipped onto the inner thrust collar 13. This can also be done by hand because the corresponding oblique surfaces 39, 40 require a low expenditure of force. Afterwards only the screw sleeve 18 need be guided over the gasket 17, with its terminal shoulder 25 engaged in the peripheral recess 24 of the gasket 17.

In this state the tension of clamp lock washer 15 is relieved and it adjoins on the outside the end flange 32 of the inner thrust collar 13. The catch projections 38 adjoin the first groove wall and the inside diameter of the clamp lock washer 15 is slightly larger than the outside diameter of the cable shield 41 which is to be clamped.

For the user this preinstalled cable clamp 10 can be easily stored and installed at the installation site, the uncertainty of a missing individual part being eliminated.

For installation, the cable clamp 10 can be pushed simply into the cable insertion connecting piece 12 as far as a stop of the housing-side external end face 42 of the inner thrust collar 13 on the face edge 43 of the inner socket piece 20, then the correspondingly stripped cable 11 can be inserted through the gasket 17 and the clamp lock washer 15 so far that the cable shield 41 is positioned at the height of the clamp lock washer 15 and then the screw sleeve 18 can be screwed securely on the external thread 19 of the plastic sleeve 21 of the cable insertion connecting piece 12. In this final installation step the gasket 17 is pressed over a large area under pressure against the cable jacket 44, the inner surface 26 of the screw sleeve 18 and the inner surface of the plastic sleeve 20 and moreover the outer thrust collar 14 is pressed against the inner thrust collar 13, the clamp lock washer 15 on its conical surfaces 30, 31 radially sliding centrally towards the axis A and in doing so being pressed into the cable shield 41 until the catch arm 37 adjoins the second groove wall 36 of the peripheral groove 34 of the inner thrust collar 13. This stroke is such that a sufficiently high clamping force is achieved and thus the required tension about the cable 11 is ensured and [that] on the other hand there is no undue deformation of the cable shield 41.

The described cable clamp 10 is therefore extremely simple and economical in production and handling, thus ensuring effective tension about the cable 11, high liquid-tightness and permanently securing contact between the cable shield 41 and the metal housing, which takes place via the clamp lock washer 15, the metal inner thrust collar 13 and the conductive inner socket piece 20.

What is claimed is:

1. A cable clamp for clamping a cable comprising:
   a clamp lock washer;
   a first thrust collar having a first outer end face and a first inner end face, and a second thrust collar having a second inner end face;
   at least two catch arms disposed from said second thrust collar that are interconnected with said first thrust collar, said catch arms being disposed to permit said first and second thrust collars to be moved closer together and further apart from each other along a linear path having a restricted fixed distance length, said clamp lock washer being disposed between said first and second inner end faces, and, distances between said first and second inner end faces increasing toward a central axis of the interconnected first and second thrust collars;
   a tubular cable penetration part having a stop shoulder located on an inner wall of said cable penetration part with said first outer end face of said first thrust collar disposed adjacent said stop shoulder; and
   a sleeve adjustably attached to said cable penetration part for movement of said sleeve to move said second thrust collar toward said first thrust collar to compress said clamp lock washer to abut against said cable.

2. The cable clamp of claim 1, wherein said first thrust collar has an annular flange disposed from said first inner end face, and said annual flange has an inside diameter that corresponds to an outside diameter of said clamp lock washer in a relieved state.

3. The cable clamp of claim 1, wherein at least one of said first or second thrust collars is made of an electrically conductive material.

4. The cable clamp of claim 1, further comprising a gasket disposed between said sleeve and a second outer end face of said second thrust collar.

5. The cable clamp of claim 4, wherein said gasket is cemented to said second outer end face.

6. The cable clamp of claim 4, wherein said gasket is injection molded to said second outer end face.

7. The cable clamp of claim 4, wherein said gasket is integral with said second outer end face.

8. The cable clamp of claim 4, wherein said sleeve includes a terminal shoulder and said gasket includes a recess into which said terminal shoulder is disposed.

9. The cable clamp of claim 4, wherein said gasket is made of a compressible material.

10. The cable clamp of claim 1, wherein said sleeve includes internal threads that mate with external threads disposed about said cable penetration part.

11. The cable clamp of claim 1, wherein said cable penetration part includes a tubular socket of a housing in which said cable is connected to electrical circuit parts.

12. The cable clamp of claim 11, wherein said cable penetration part includes a plastic molded sleeve disposed about said socket.

13. A cable clamp for clamping a cable comprising:
    a clamp lock washer;
    a first thrust collar having a first outer end face and a first inner end face, and a second thrust collar having a second inner end face;
    at least two catch arms disposed from said second thrust collar that are interconnected with said first thrust collar, said catch arms being disposed to permit said first and second thrust collars to be moved closer together and further apart from each other along a linear path having a restricted fixed distance length, said clamp lock washer being disposed between said first and second inner end faces, and, distances between said first and second inner end faces increasing toward a central axis of the interconnected first and second thrust collars;
    a tubular cable penetration part having a stop shoulder located on an inner wall of said cable penetration part with said first outer end face of said first thrust collar disposed adjacent said stop shoulder; and
    a sleeve adjustably attached to said cable penetration part for movement of said sleeve to move said second thrust collar toward said first thrust collar to compress said clamp lock washer to abut against said cable wherein said first thrust collar has a peripheral groove disposed about an outside diameter that is indented toward a central axis of said first thrust collar, and said second thrust collar has said catch arms disposed about a peripheral region.

14. The cable clamp of claim 13, wherein each of said catch arms has a catch projection that projects radially toward a central axis of said second thrust collar, said catch projections being adapted to elastically fit over and behind a first wall projecting out from said peripheral groove of said first thrust collar.

15. The cable clamp of claim 14, wherein said catch projections are tapered conically toward the central axis of said second thrust collar.

16. The cable clamp of claim 14, wherein said first wall projects away from said peripheral groove by a distance that is less than that of a second wall also projecting away out from said peripheral groove.

17. The cable clamp of claim 16, wherein said first wall projects out from said peripheral groove by a distance equal to a distance said catch projections project radially from said catch arms toward the central axis of said second thrust collar.

18. A method for clamping a cable comprising:
providing a clamp lock washer;
providing (i) a first thrust collar having a first outer end face and a first inner end face, and (ii) a second thrust collar having a second inner end face;
positioning said clamp lock washer between said first and second inner faces;
interconnecting said first and second thrust collars to permit said first and second thrust collars to be moved closer together and further apart from each other along a central axis of the interconnected said first and second thrust collars, this movement being along a linear path having a restricted fixed distance length, said clamp lock washer being retained between the interconnected said first and second inner faces;
providing a tubular cable penetration part having a stop shoulder located on an inner wall of said cable penetration part;
positioning said first outer end face of said first thrust collar adjacent said stop shoulder;
providing a sleeve movably attached to said cable penetration part; and
moving said sleeve with respect to said cable penetration part to move said second thrust collar closer to said first thrust collar to compress said clamp lock washer to abut against said cable.

19. A cable clamp for clamping a cable comprising:
a clamp lock washer;
a first thrust collar having a first outer end face and a first inner end face, and a second thrust collar having a second inner end face;
at least two catch arms disposed from said first thrust collar that are interconnected with said second thrust collar, said catch arms being disposed to permit said first and second thrust collars to be moved closer together and further apart from each other along a linear path having a restricted fixed distance length, said lock washer being disposed between said first and second inner end faces, and distances between said first and second inner end faces increasing toward a central axis of the interconnected first and second trust collars;
a tubular cable penetration having a stop shoulder located on an inner wall of said cable penetration part with said first outer end face of said first thrust collar disposed adjacent said stop shoulder; and
a sleeve adjustably attached to said cable penetration part for movement of said sleeve to move said second thrust collar toward said first thrust collar to compress said clamp lock washer to abut against said cable.

20. The cable clamp of claim 19, wherein said second thrust collar has an annular flange disposed from said first inner end face, and said annual flange has an inside diameter that corresponds to an outside diameter of said clamp lock washer in a relieved state.

21. The cable clamp of claim 19, wherein at least one of said first or second thrust collars is made of an electrically conductive material.

22. The cable clamp of claim 19, further comprising a gasket disposed between said sleeve and a second outer end face of said second thrust collar.

23. The cable clamp of claim 22, wherein said gasket is cemented to said second outer end face.

24. The cable clamp of claim 22, wherein said gasket is injection molded to said second outer end face.

25. The cable clamp of claim 22, wherein said gasket is integral with said second outer end face.

26. The cable clamp of claim 22, wherein said sleeve includes a terminal shoulder and said gasket includes a recess into which said terminal shoulder is disposed.

27. A cable clamp for clamping a cable comprising:
a clamp lock washer;
a first thrust collar having a first outer end face and a first inner end face, and a second thrust collar having a second inner end face;
at least two catch arms disposed from said first thrust collar that are interconnected with said second thrust collar, said catch arms being disposed to permit said first and second thrust collars to be moved closer together and further apart from each other along a linear path having a restricted fixed distance length, said lock washer being disposed between said first and second inner end faces, and distances between said first and second inner end faces increasing toward a central axis of the interconnected first and second trust collars;
a tubular cable penetration having a stop shoulder located on an inner wall of said cable penetration part with said first outer end face of said first thrust collar disposed adjacent said stop shoulder; and
a sleeve adjustably attached to said cable penetration part for movement of said sleeve to move said second thrust collar toward said first thrust collar to compress said clamp lock washer to abut against said cable wherein said second thrust collar has a peripheral groove disposed about an outside diameter that is indented toward a central axis of said second thrust collar, and said first thrust collar has said catch arms disposed about a peripheral region.

28. The cable clamp of claim 27, wherein each of said catch arms has a catch projection that projects radially toward a central axis of said first thrust collar, said catch projections being adapted to elastically fit over and behind a first wall projecting out from said peripheral groove of said second thrust collar.

29. The cable clamp of claim 28, wherein said catch projections are tapered conically toward the central axis of said first thrust collar.

30. The cable clamp of claim 28, wherein said first wall projects away from said peripheral groove by a distance that is less than that of a second wall also projecting away out from said peripheral groove.

31. The cable clamp of claim 30, wherein said first wall projects out from said peripheral groove by a distance equal to a distance said catch projections project radially from said catch arms toward the central axis of said first thrust collar.

32. The cable clamp of claim 22, wherein said gasket is made of a compressible material.

33. The cable clamp of claim 19, wherein said sleeve includes internal threads that mate with external threads disposed about said cable penetration part.

34. The cable clamp of claim 19, wherein said cable penetration part includes a tubular socket of a housing in which said cable is connected to electrical circuit parts.

35. The cable clamp of claim 34, wherein said cable penetration part includes a plastic molded sleeve disposed about said socket.

* * * * *